Aug. 25, 1931. C. C. ARRASMITH ET AL 1,820,767
CAMERA
Filed July 17, 1928 2 Sheets-Sheet 1
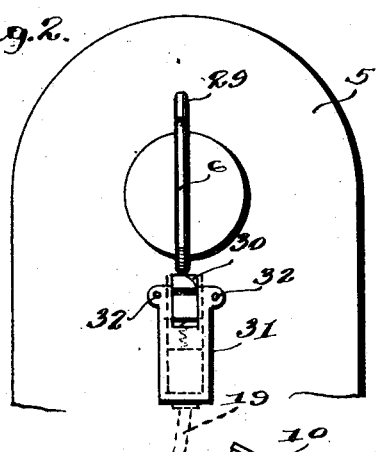
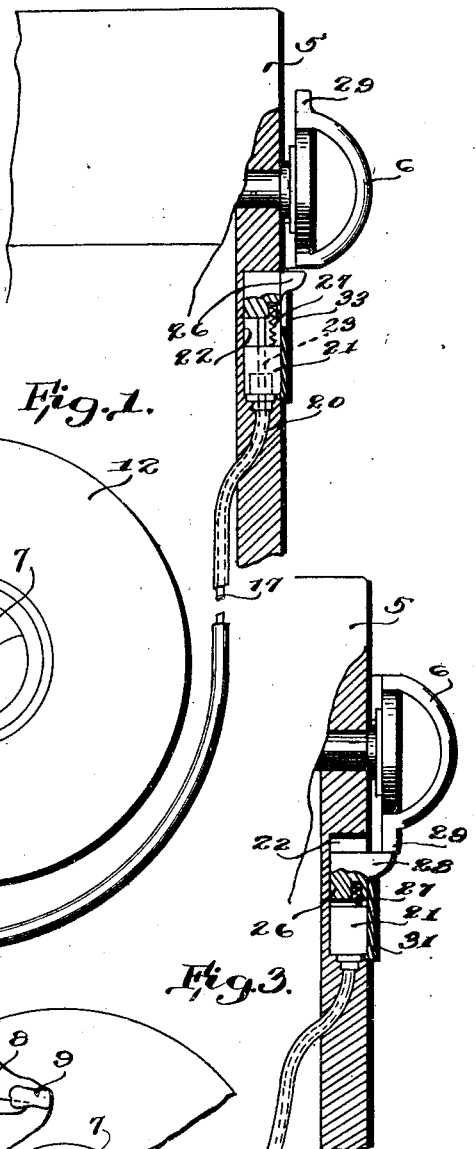
INVENTOR
C.C. Arrasmith
H.D. Markwell
BY
ATTORNEY Aug. 25, 1931.  C. C. ARRASMITH ET AL  1,820,767
CAMERA
Filed July 17, 1928   2 Sheets-Sheet 2
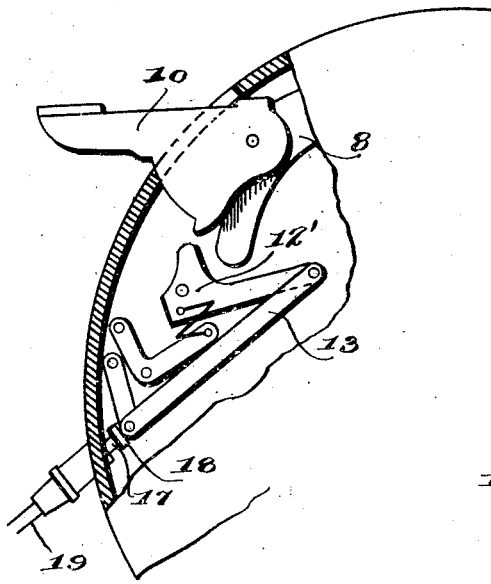
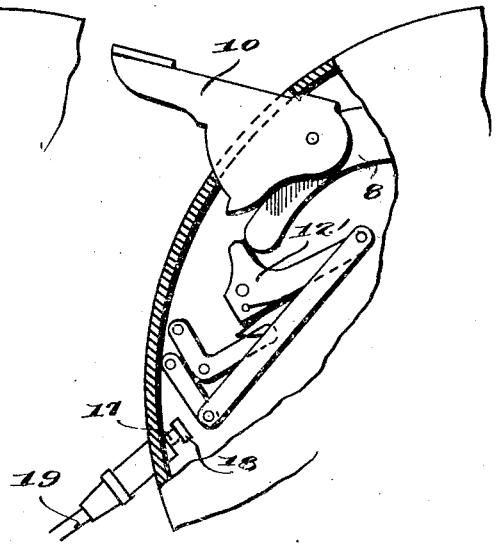
INVENTOR
C. C. Arrasmith
H. D. Markwell
BY
ATTORNEY Patented Aug. 25, 1931

1,820,767

UNITED STATES PATENT OFFICE

CLAUDE C. ARRASMITH AND HARRY D. MARKWELL, OF EDMONDS, WASHINGTON

CAMERA

Application filed July 17, 1928. Serial No. 293,357.

Our invention relates to cameras and more particularly to devices for preventing the double exposure of films.

An object of the invention is to provide a mechanism which will prevent actuation of the usual shutter actuation lever until the film has been moved to operative position for taking an exposure.

More specifically the invention provides a camera attachment embodying a latch element normally engaged with the shutter control mechanism to prevent operation of the latter together with means for actuating the latch element to inoperative position which is operable incident to the rotation of one of the roll holding spools.

With the preceding and other objects and advantages in mind, the invention consists in the novel combination of elements, constructions and arrangement of parts to be hereinafter specifically referred to, claimed and illustrated in the accompanying drawings, wherein:

Figure 1 is a fragmentary view partly in elevation and partly in section of a camera equipped with the invention, Figure 2 is a fragmentary side elevation of the camera and illustrating the latch actuating device embodied in the invention, Figure 3 is a view similar to Figure 1 but illustrating the invention in actuated position, Figure 4 is a view similar to Figure 2 and illustrating the latch actuating device in depressed or actuated position, Figure 5 is an enlarged fragmentary view having parts broken away and showing the latch and its associated mechanism in actuated position, and Figure 6 is a similar view and showing the parts in the act of being returned to normal position.

Referring to the invention in detail a conventional camera 5 having a film roll winding key 6 at one side and the usual shutter 7 at the front thereof is provided. This shutter 7 is of a conventional type and embodies a shutter trip 8 normally engaged with a shutter lever 9 and pivotally carried by the usual control lever 10. The shutter trip 8 is rocked forwardly to actuate the shutter by means of a flexible plunger 11 movable through one side of a circular housing 12 in which the shutter mechanism is housed.

In order to normally retain the shutter trip against actuation an L-shaped latch element 12' is pivoted in the housing in the path of movement of the shutter trip and is normally engaged therewith as particularly illustrated in Figure 1. A longitudinally shiftable link 13 is arranged in the housing with one end pivoted to one end of the latch element as at 14 and its opposite end pivoted to a lever 15 which has one end pivotally supported in the housing, as at 16.

In order to shift the link 13 in an upward longitudinal direction to swing the latch element rearwardly to inactive position, a longitudinally movable flexible cable 17 is provided and has one end passing through the housing 12 in longitudinal alinement with the link and terminating in a head 18 which contacts with the lower end of the link. This flexible cable is encased in a tubular flexible housing 19 having one end attached to the housing 12 and its opposite end extended through an opening 20 in one of the side walls of the camera below the winding key 6 and attached to the lower end of a block 21 lying within a vertically extending recess 22 also provided in this side wall. The block 21 is provided with a central bore 23 through which the upper end of the flexible cable extends.

To retain the latch element in either of the positions disclosed in Figures 1 and 3, an expansible spring 24 has one end attached to the latch element and its opposite end secured to a bracket 25 supported within the housing 12 at a point between the latch element and lever 15. It will be observed that the spring is connected with the latch element at a point which is offset from its axis so that when the latch element is in either of the positions illustrated in Figures 1 and 2 it will remain until moved by the actuation of the link 13. For the purpose of depressing the flexible cable to shift the link 13 in an upward direction and hence rock the latch element rearwardly to inoperative position, a plunger 26 is arranged in the recess 22 for vertical movement therein above the block 21. The plunger is normally urged upwardly against the upper wall of the recess 22 by means of an expansible spring 27 which is interposed between the block and plunger.

Normally the upper end of the flexible cable projects above the block 21. In order to depress the plunger against this projecting end of the flexible cable to actuate the latch element to inactive position, a laterally projecting lug 28 is formed on the plunger and is adapted to be engaged by a lug 29 formed on the winding key 6. A cam surface 30 is formed on the upper end of the plunger over which the lug rides until it rests upon the upper end of the plunger as illustrated in Figure 4.

To retain the block 21 and plunger 26 within the recess a channel shaped housing 31 overlies the recess and is secured to the camera by fastenings 32. This housing 31 is provided with a vertically extending slot 33 through which the lug 28 passes.

In the operation of the invention the key 6 is rotated to dispose a film in the exposure area of the camera. Incident to the rotation of the key the plunger is depressed into engagement with the projecting end of the flexible cable and retained in this position by reason of the lug 29 resting upon the upper end of the plunger. This movement of the plunger moves the flexible cable longitudinally which in turn shifts the link 13 upwardly in a longitudinal direction, rocking the latch element rearwardly to occupy a position where it is out of the way of the shutter trip 8, as illustrated in Figure 3. The shutter trip can now be moved forwardly to actuate the shutter mechanism.

When the shutter trip is moved forwardly to make an exposure it engages the upper end of the link 13 to move the parts to the position shown in Figure 5 so that upon return movement of the shutter trip the latter will ride over the latch element to permit the latter to return to its active position. As the shutter trip returns to normal position it rides on the longest leg of the latch element to return the link 13 to normal position preparatory to the next operation.

What is claimed is:—

1. In combination a roll film camera having side walls, a shutter trip, a latch device for retaining the shutter trip against actuation, a winding key having a portion extending through one of said side walls, said side wall having a recess below the winding key of the film roll, a spring pressed plunger vertically movable in the recess and normally urged in an upward direction and having a laterally extending lug provided with a cam surface at one side, a longitudinally movable flexible element having one end arranged in the recess in the path of movement of the plunger and its opposite end operatively connected with the latch device, and a lug on the winding key and engageable with the cam surface to depress the spring pressed plunger to render the latch device inoperative upon rotating the winding key a partial revolution.

2. In combination a roll film camera having side walls, a shutter trip, a latch device for retaining the shutter trip against actuation, a winding key having a portion extending through one of said side walls, said side wall having a recess below the winding key of the film roll, a spring pressed plunger vertically movable in the recess and normally urged in an upward direction and having a laterally extending lug provided with a cam surface at one side, a longitudinally movable flexible element having one end arranged in the recess in the path of movement of the plunger and its opposite end operatively connected with the latch device, and a lug on the winding key and engageable with the cam surface to depress the spring pressed plunger to render the latch device inoperative upon rotating the winding key a partial revolution, when in depressed position the plunger serving the additional function of holding the winding key against accidental rotation.

CLAUDE C. ARRASMITH.
HARRY D. MARKWELL.